United States Patent
Wang et al.

(10) Patent No.: US 10,212,358 B2
(45) Date of Patent: Feb. 19, 2019

(54) IMAGING DEVICES WITH OPTICAL SHUTTERS AND LOW-POWER DRIVERS THEREFOR

(71) Applicant: Samsung Electronics Co., Ltd., Suwon-si, Gyeonggi-do (KR)

(72) Inventors: Yibing Michelle Wang, Temple City, CA (US); Ilia Ovsiannikov, Studio City, CA (US); Yong-Hwa Park, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/911,153

(22) Filed: Mar. 4, 2018

(65) Prior Publication Data

US 2018/0191936 A1    Jul. 5, 2018

Related U.S. Application Data

(63) Continuation of application No. 14/807,876, filed on Jul. 23, 2015, now abandoned.
(Continued)

(51) Int. Cl.
*H04N 5/238* (2006.01)
*H04N 5/235* (2006.01)
(Continued)

(52) U.S. Cl.
CPC .......... *H04N 5/2353* (2013.01); *G03B 7/00* (2013.01); *G03B 9/08* (2013.01); *H04N 5/23241* (2013.01); *G03B 15/05* (2013.01)

(58) Field of Classification Search
CPC .................................................. H04N 5/2353
(Continued)

(56) References Cited

U.S. PATENT DOCUMENTS 4,882,620 A    11/1989   Shimizu et al.
6,630,952 B1   10/2003   Beale
(Continued)

FOREIGN PATENT DOCUMENTS

DE    102011078338 A1    1/2013

OTHER PUBLICATIONS

Conroy, Richard M. et al. "A Power-Saving Modulation Technique for Time-of-Flight Range Imaging Sensors," Proc. of SPIE, vol. 8085, Videometrics, Range Imaging, and Applications XI, 808506, Jun. 21, 2011, 13 pages.
(Continued)

*Primary Examiner* — Usman A Khan
(74) *Attorney, Agent, or Firm* — Renaissance IP Law Group LLP

(57) ABSTRACT

An imaging device includes at least a first group of pixels. A driver block is configured to generate at least two shutter signals, each having on-phases periodically alternating with off-phases. The shutter signals might not be in phase. The imaging device may have an optical shutter that is partitioned in two or more parts, or a set of two or more optical shutters. The shutter parts, or the shutters, may receive the shutter signals, and accordingly open and close. A design of the driver block requires reduced power, which is highly desirable for mobile applications. Moreover, 3D imaging may be implemented that uses various time-of-flight configurations.

19 Claims, 19 Drawing Sheets

IMAGING DEVICE

Related U.S. Application Data

(60) Provisional application No. 62/089,170, filed on Dec. 8, 2014.

(51) Int. Cl.
*G03B 7/00* (2014.01)
*H04N 5/232* (2006.01)
*G03B 9/08* (2006.01)
*G03B 15/05* (2006.01)

(58) Field of Classification Search
USPC .......................................................... 348/367
See application file for complete search history.

(56) References Cited

U.S. PATENT DOCUMENTS

| | | | | |
|---|---|---|---|---|
| 6,635,011 | B1 * | 10/2003 | Ozawa | A61B 1/00096 |
| | | | | 348/E5.029 |
| 8,396,321 | B1 * | 3/2013 | Aldrich | H04N 5/23254 |
| | | | | 348/208.1 |
| 2003/0022631 | A1 * | 1/2003 | Rhodes | H04B 1/48 |
| | | | | 455/78 |
| 2013/0181119 | A1 * | 7/2013 | Bikumandla | H01L 27/14612 |
| | | | | 250/214.1 |

OTHER PUBLICATIONS

Qimaging, Digital Imaging Made Easy, "Rolling Shutter vs. Global Shutter," (www.qimaging.com), 2014, 9 pages.

* cited by examiner

FIG. 1   *IMAGING DEVICE*

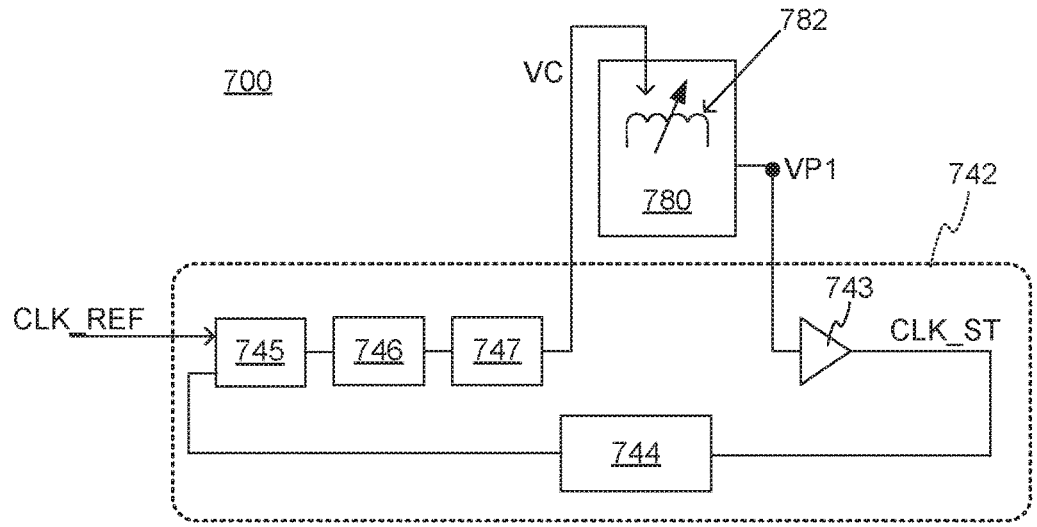
FIG. 7  *LOCKED LOOP CONFIGURATION*
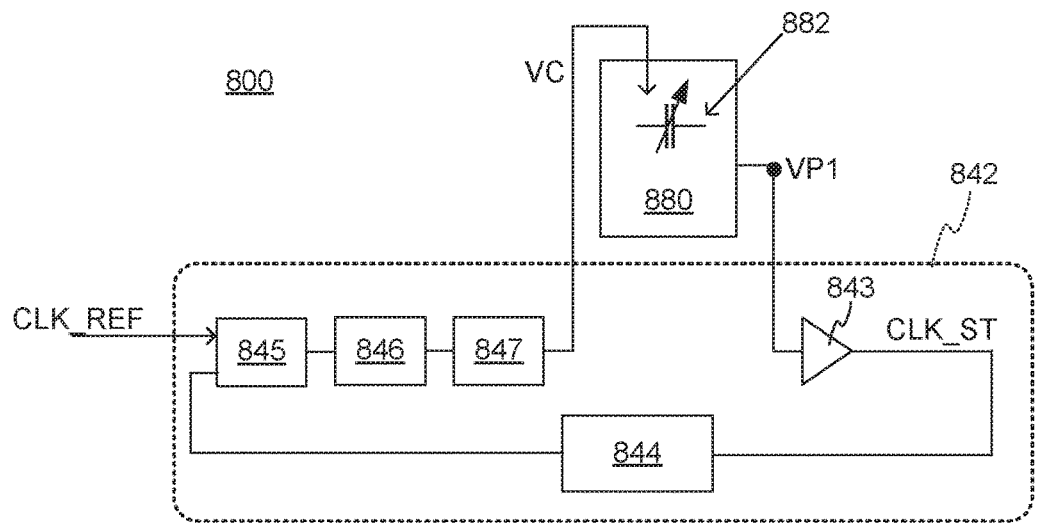
FIG. 8  *LOCKED LOOP CONFIGURATION*

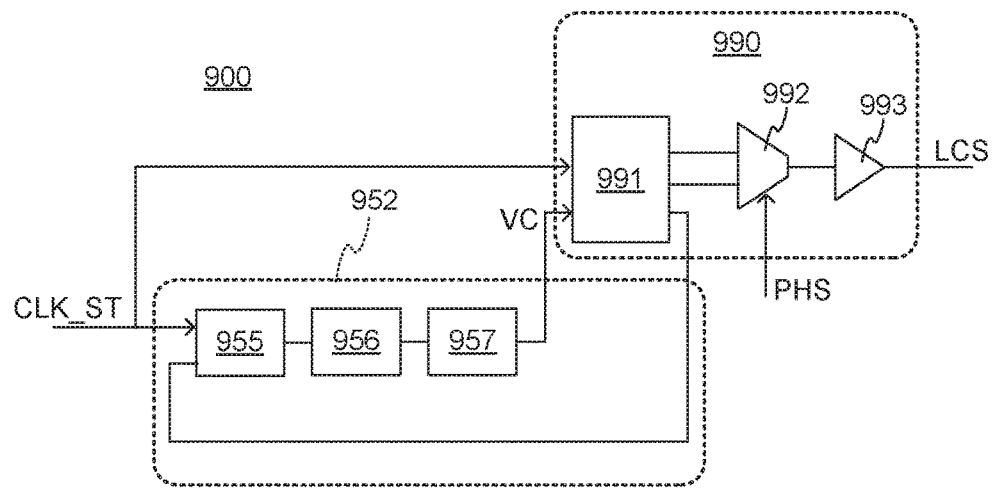
FIG. 9   *LOCKED LOOP*
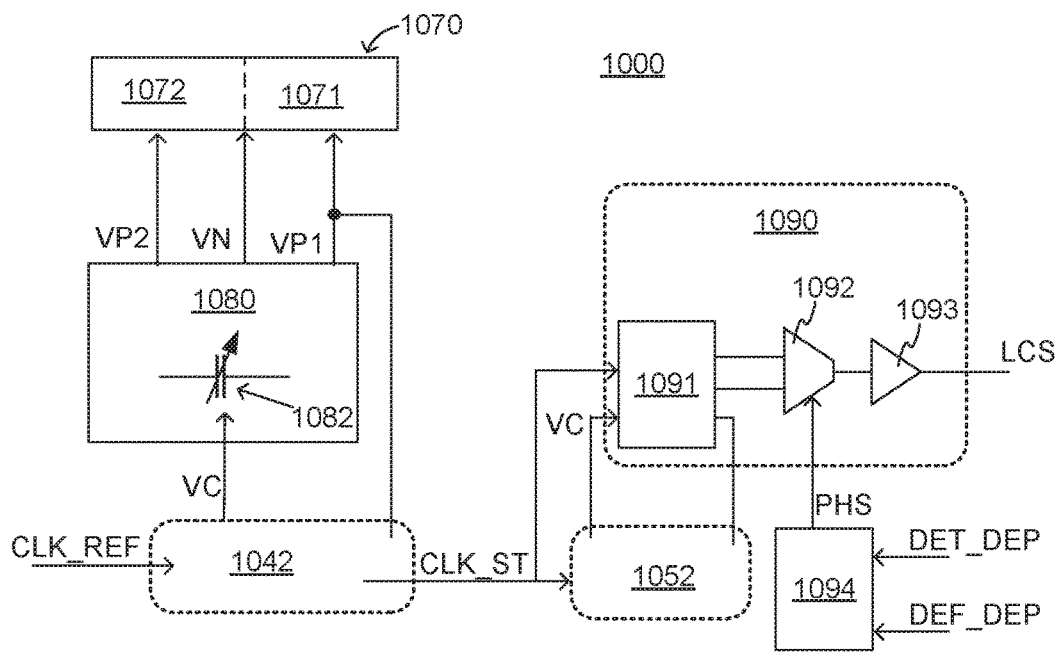
FIG. 10   *ARCHITECTURE*

3-PHASE DRIVER BLOCK

*OPTICAL SHUTTER*
*PARTITIONED IN THREE PARTS*

FIG. 18  *PARTITIONED OPTICAL SHUTTERS*

6-PHASE DRIVER BLOCK

IMAGING DEVICES WITH OPTICAL SHUTTERS AND LOW-POWER DRIVERS THEREFOR

CROSS REFERENCE TO RELATED PATENT APPLICATIONS

This patent application is a continuation of and claims the priority benefit under 35 U.S.C. § 120 of the U.S. patent application Ser. No. 14/807,876 filed on Jul. 23, 2015, which claims the priority benefit of commonly assigned U.S. Provisional Application Ser. No. 62/089,170 filed on Dec. 8, 2014, the disclosures of both of these applications are incorporated herein by reference in their entireties.

BACKGROUND

Imaging devices, which are also known as cameras, are used for capturing images of a person, object or scene as desired. Modern imaging devices use pixels to capture images. The pixels may be provided in an array, which can also be called a sensor. The pixels divide an input image in elements, and capture values for the elements of the image. These values for the image are captured by various techniques, such as numbers of electrons per pixel after a brief exposure time. The output image is typically constructed from the captured values, whether in color or in black and white.

Imaging devices can also be used for ranging, i.e., determining the distance of the person, object or scene from the imaging device. Determining the distance is also sometimes called three-dimensional imaging. The distance may be determined by flashing specially modulated light, and detecting how long is needed for the reflections of the modulated light to return to the imaging device. This is called the time-of-flight (TOF) principle, and requires demodulation of the reflected optical signals.

Imaging often uses a shutter for the pixel. The shutter can be optical, of the type that physically prevents the incoming light from reaching the pixels. A challenge with optical shutters is that they often have a high capacitance, need a high voltage swing to open and close, and therefore consume a lot of power to operate. For example, an existing design for a shutter driver consumes a power of 4.8 W for TOF operation.

Sometimes the shutter is electrical, which means the pixels become at times electrically prevented from imaging. This consumes power, however, which in turn limits the spatial resolution of the overall sensor.

BRIEF SUMMARY

The present description gives instances of imaging devices and methods, the use of which may help overcome problems and limitations of the prior art.

In embodiments, an imaging device includes at least a first group of pixels. A driver block is configured to generate at least two shutter signals, each having on-phases periodically alternating with off-phases. The shutter signals might not be in phase. The imaging device may have an optical shutter that is partitioned in two or more parts, or a set of two or more optical shutters. The shutter parts, or the shutters, may receive the shutter signals, and accordingly open and close. The first group of pixels starts receiving light when the first shutter part or shutter opens, and stops receiving light when it closes.

An advantage of embodiments can be that much less power is required by the driver block, which is highly desirable for mobile applications. Accordingly, one or more off-chip optical shutters may be used instead of on-chip electrical shutters, which may remove the sensor spatial resolution limitation caused by the power consumption of the electrical shutters. Moreover, 3D imaging may be implemented that uses various TOF configurations.

Another advantage is that such driver blocks may be able to work with a variety of TOF configurations, and without needing to change the image processing algorithm for the depth calculations.

One more advantage of some embodiments can be that an LED driver for TOF operation can be synchronized with the operation of the optical shutter.

These and other features and advantages of this description will become more readily apparent from the Detailed Description, which proceeds with reference to the associated drawings in which:

BRIEF DESCRIPTION OF THE DRAWINGS

FIG. 7 is a block diagram showing how sample support components may support a locked loop operation of a driver block according to embodiments.

FIG. 8 is a block diagram showing how other sample support components may support a locked loop operation of a driver block according to other embodiments.

FIG. 9 is a block diagram showing how sample support components that may support an operation of a light driver according to embodiments.

FIG. 10 is a block diagram showing a sample architecture for components of a device made according to embodiments.

DETAILED DESCRIPTION

As has been mentioned, the present description is about imaging devices and methods. Embodiments are now described in more detail.

Figure 1:
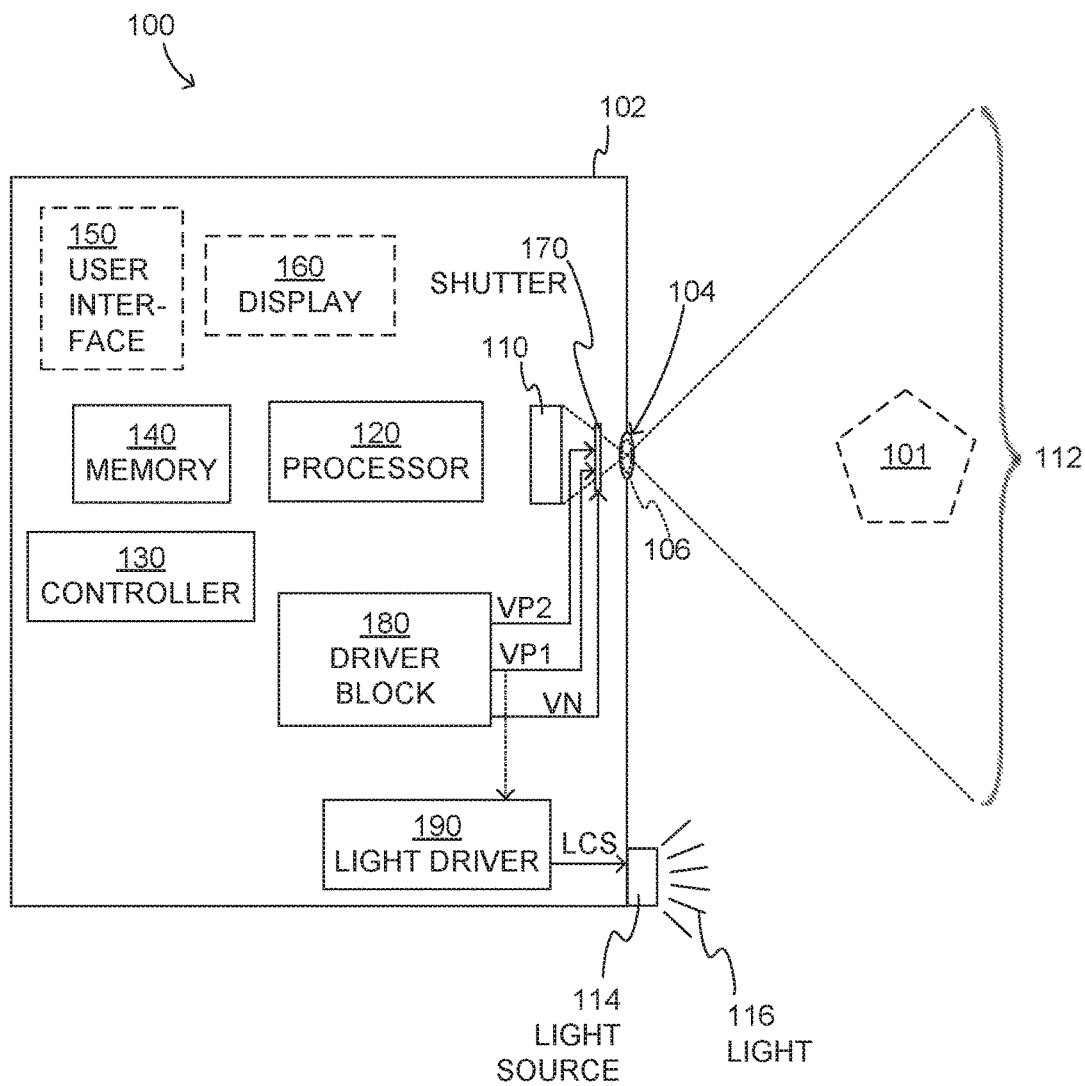
FIG. 1 is a block diagram of a sample device made according to embodiments.

FIG. 1 is a block diagram of a device 100, which can be implemented according to different embodiments. Device 100 could have many embodiments. For example, device 100 may be an imaging device, configured to capture an image of an object 101. For another example, device 100 may be a ranging device, configured to determine a distance of object 101 from device 100. That distance is also called the range. In some embodiments, device 100 is both an imaging device and a ranging device.

Device 100 can have a casing 102 that can also be called housing. An opening 104 is provided in casing 102. A lens 106 may be provided optionally at opening 104.

Device 100 also has at least a first group of pixels, and possibly also a second and other additional groups of pixels. The pixels can be positioned within casing 102 so as to receive light through opening 104. The first group of pixels, and possibly also a second group of pixels, may be arranged within a single pixel array. Or, the first group of pixels may be arranged in a different array than the second group of pixels. The pixel groups may be differentiated because, as will be seen, different ones may be affected by different parts of a shutter, or by different shutters. The pixels of one or more of the groups may be arranged on a pixel chip 110. Pixel chip 110 is configured to receive light through opening 104, and capture it. Accordingly, pixel chip 110, opening 104 and lens 106 define a field of view 112. Of course, field of view 112 and object 101 are in three dimensions, while FIG. 1 shows them in two dimensions.

Casing 102 can be aligned, so that object 101, or a person or a scene as desired, will be brought within field of view 112, so that it presents an input image. A light source 114, such as an LED, may be further provided on casing 102, so as to assist in the imaging and/or ranging operation of device 100. Light source 114 can be configured to transmit modulated light 116 towards field of view 112, so as to illuminate persons and objects within it, such as object 101. Modulated light 116 can be reflected by object 101 and then be received via opening 104, in addition to ambient light received by reflection from object 101. Accordingly, at least the first group of pixels can be configured to image reflections of modulated light 116 from object 101.

Accordingly, light source 114 can assist in imaging by illuminating object 101 with modulated light 116. This is especially useful in embodiments where at least the first group of pixels includes TOF pixels. Light source 114 may be operating responsive to a light clock signal LCS, and thus it may modulate transmitted light 116 according to how light clock signal LCS is modulated.

As mentioned above, pixel chip 110 can capture light received via opening 104. More particularly, in many embodiments, pixel chip 110 has one or more two-dimensional arrays of pixels. The pixels in an array can be arranged in rows and columns, although other arrangements are also possible. When the pixels are exposed to an input image, i.e. receive light from the image, they generate signals responsive to the light they receive. Typically these signals are in the form of electric charges. By their magnitude, these signals encode individual sensed values for the light, which is why they are also called samples. Taken together, the samples may render an output image that is a version of the sensed input image. This is also why the entire pixel chip 110 is sometimes called an image sensor.

Device 100 may additionally include a processor 120. Processor 120 may perform image processing functions upon receiving the signals or samples from pixel chip 110. Processor 120 may also perform additional functions, for example adjust imaging parameters of the samples, of the exposure, etc.

Device 100 may further include a controller 130, which can be configured to control the operation of pixel chip 110 and other components of device 100. In some embodiments, controller 130 receives inputs from processor 120. Processor 120 and/or controller 130 can be implemented with one or more Central Processing Units (CPUs), digital signal processors, microprocessors, microcontrollers, application-specific integrated circuits (ASICs), programmable logic devices (PLDs), and so on. Controller 130 may optionally be formed integrally with pixel chip 110, processor 120, and possibly also with other components of device 100, perhaps in a single integrated circuit. Controller 130 may control and operate pixel chip 110, by transmitting control signals from output ports, and so on, as will be understood by those skilled in the art.

Device 100 may further include a memory 140. The samples can be stored in memory 140, preferably as digital values representing the signals generated by the pixels. The samples may be further processed before and/or after being stored in memory 140. In embodiments, memory 140 is configured to store final samples computed by processor 120 as the output image.

Device 100 may moreover include a user interface 150, which can be configured to receive inputs from the user. The inputs can be for controlling the operation of device 100, such as for adjusting imaging parameters and/or image processing parameters. In some embodiments, interface 150 is implemented by one or more standalone components, such as actuators, buttons, circular wheels and the like on casing 102.

Optionally, device 100 also includes a display 160, which can be considered to be part of user interface 150. Display 160 can include a screen. When provided, display 160 can display the samples as the rendered image. A user can view this image, and use it to better align casing 102, so that object 101 will be placed within field of view 112. Moreover, a user may decide to adjust imaging parameters and/or image processing parameters while receiving feedback from the image displayed in display 160. The screen of display 160 can be a touchscreen, through which inputs can be received by the user.

Device 100 also includes one or more optical shutters 170, and a driver block 180. Driver block 180 can be configured to generate a first shutter signal VP1, a second shutter signal VP2, and possibly additional shutter signals. These shutter signals may be considered with reference to a negative voltage VN that may also be generated by driver block 180 at a suitable node.

Figure 2:
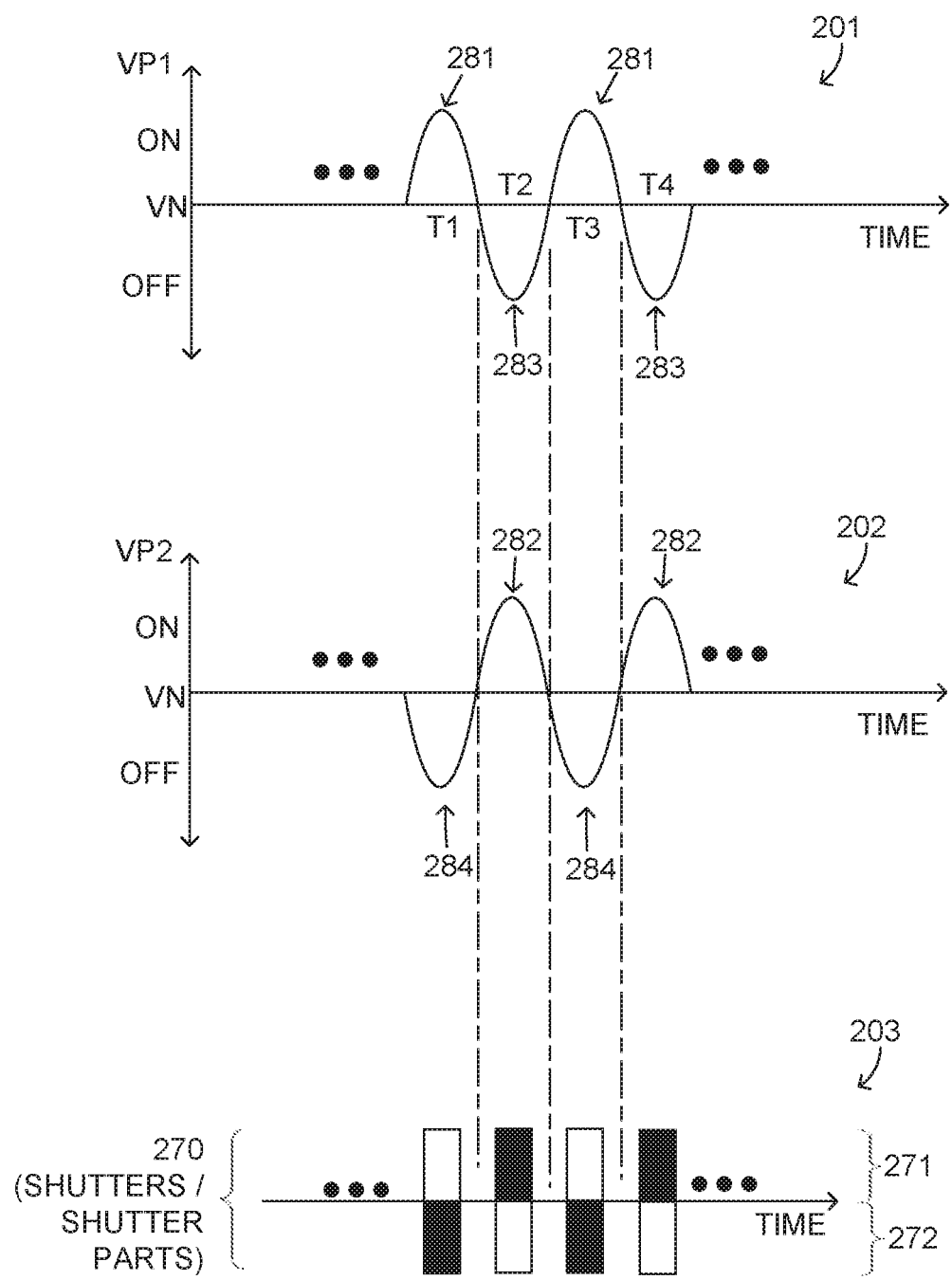
FIG. 2 is a series of sample time diagrams for explaining how a driver block may operate a shutter in the device of FIG. 1.

Referring to FIG. 2, examples of the shutter signals are shown. Diagram 201 is a time waveform of a first sample shutter signal VP1. Signal VP1 has on-phases 281 periodically alternating with off-phases 283. In this example, the phases are shown as substantially sinusoidal, but such is not required and different waveforms may be used, such as triangular, square, etc. On-phases 281 occur at times T1, T3, while off-phases 283 occur at times T2, T4. Diagram 202 is a time waveform of a second sample shutter signal VP2. Signal VP2 has on-phases 282 periodically alternating with off-phases 284. On-phases 282 occur at times T2, T4, while off-phases 284 occur at times T1, T3.

As will be observed, first shutter signal VP1 has a period T1+T2 that is substantially identical to a period of the second shutter signal. A good value for this period is one that corresponds to a frequency suitable for enabling 3D TOF imaging. For distances of 1 m to 7.5 m such a suitable frequency is about 20 MHz, and for a shorter range a higher frequency should be used.

In addition, on-phases 281 of first shutter signal VP1 are not in phase with on-phases 282 of second shutter signal VP2. In fact, on-phases 281 are substantially out of phase from on-phases 282.

Returning to FIG. 1, in some embodiments, a single optical shutter 170 is provided, which is partitioned in two or more distinct shutter parts. In other embodiments, two or more distinct optical shutters 170 are provided. What is written about the distinct shutter parts in some embodiments may also apply to other embodiments that have a set of multiple shutters. While a single optical shutter 170 is drawn as a single component in FIG. 1, this duality is better represented in diagram 203 of FIG. 2. Indeed, diagram 203 can be considered to show a time diagram of the states of shutters 270, which include a first shutter 271 and a second shutter 272 distinct from first shutter 271. Or diagram 203 can be considered to show a time diagram of the states of a single shutter 270, which includes a first shutter part 271 and a second shutter part 272 distinct from first shutter part 271.

In embodiments, first shutter part 271 is driven by first shutter signal VP1 to alternatingly open and close responsive to on-phases 281 and to off-phases 283 respectively of first shutter signal VP1. First shutter part 271 is shown clear to depict it is open, and is shown black to depict it is closed. Similarly, second shutter part 272 is driven by second shutter signal VP2 to alternatingly open and close responsive to on-phases 282 and to off-phases 284 respectively of second shutter signal VP2.

The shutters and/or shutter parts can be positioned within the casing between opening 104 and pixel chip 110, so they are capable of physically obstructing the light from reaching pixel chip 110. Accordingly, the first group of pixels may start receiving light through opening 104 responsive to first shutter part 271 opening, and may stop receiving light through opening 104 responsive to first shutter part 271 closing. In addition, if provided, a second group of the pixels can be positioned within the casing so as to start receiving light through opening 104 responsive to second shutter part 272 opening, and to stop receiving light through opening 104 responsive to second shutter part 272 closing. Moreover, for TOF operation, more than one openings may be provided than opening 104, and the shutters or the shutter parts are able to block light from different ones of these openings.

Figure 3:
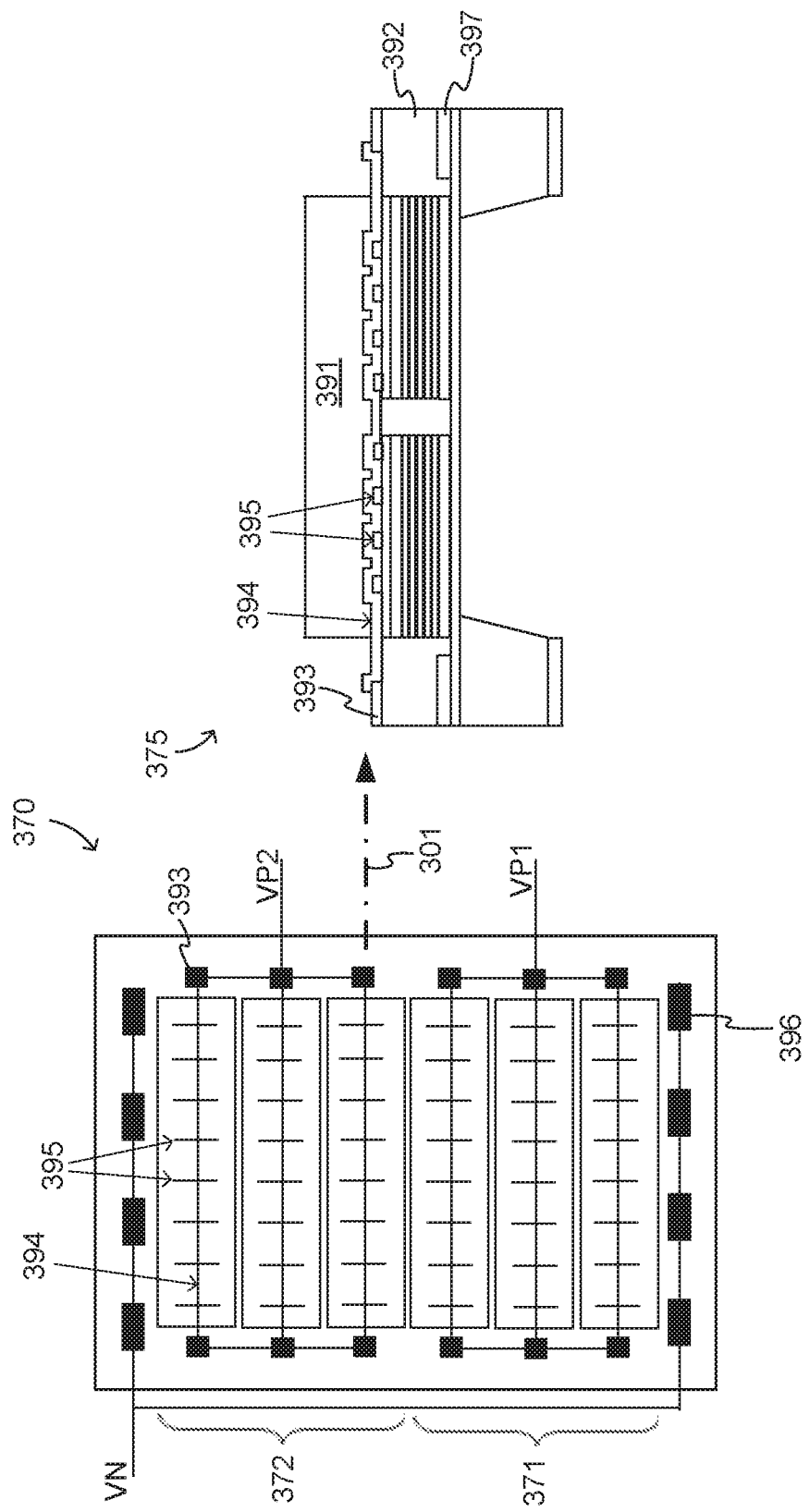
FIG. 3 is a plan view and a related elevation view of a sample optical shutter that could be used in the device of FIG. 1 according to embodiments.

FIG. 3 shows a plan view 370 of an optical shutter, and a related elevation view 375 that is taken along a line 301 of view 370. For the shutter in view 370, the pixels are located beneath the plane of the diagram, and light arrives from above the plane of the diagram. Light goes through the plane of the diagram and reaches the pixels while the shutter is open, but not when it is closed. In this example, the shutter is partitioned in two parts 371, 372 according to embodiments. The shutter opens and closes responsive to positive shutter signals VP1, VP2, which are taken with reference to a negative shutter signal VN. Signal VN is applied to n-pads 396 of an n-electrode that surrounds the periphery of the element. Positive shutter signals VP1, VP2 are applied at p-pads 393, and from there are transferred to a lattice having a fishbone structure with a spine 394 and ribs 395. n-pads 396 and p-pads 393 are open so that they are accessible to printed circuit board (PCB) wiring.

For the shutter in view 375, light travels from top to bottom within the plane of the diagram. The light first encounters a piece of sapphire 391 that may be micromachined, plus other materials whose transparency or not depends on the above-described shutter signals being applied. Such materials may be called electro-absorptive. n-electrode 397 receives its signal from n-pads 396, and is separated from p-pads 393 by a dielectric 392.

Figure 4:
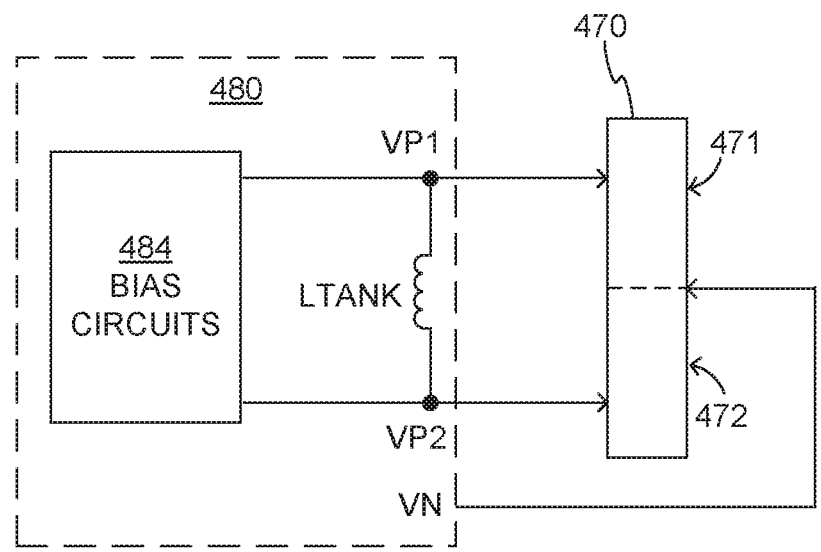
FIG. 4 is a block diagram of sample components according to embodiments, which may be used in the device of FIG. 1.

FIG. 4 shows a driver block 480 that drives a shutter 470, which has been partitioned in two parts 471, 472 according to embodiments. Driver block 480 may generate a first shutter signal VP1 and a second shutter signal VP2, which can be as described above. In this example, driver block 480 thus generates these two shutter signals, although more are possible. Driver block 480 may also generate a negative shutter signal VN. Signals VP1, VP2, VN can be applied to shutter 470 similarly to how they are shown applied to the shutter in view 370 of FIG. 3.

Driver block 480 includes bias circuits 484, and at least one inductor LTANK that is coupled between nodes that output the first and second shutter signals VP1, VP2. Inductor LTANK preferably has a value that forms a resonant tank with the capacitances of shutter parts 471, 472 (not shown). While a single inductor LTANK is shown, there may be a multitude of inductors—in fact an additional tunable inductor may be provided in parallel to further tune the frequency.

Figure 5:
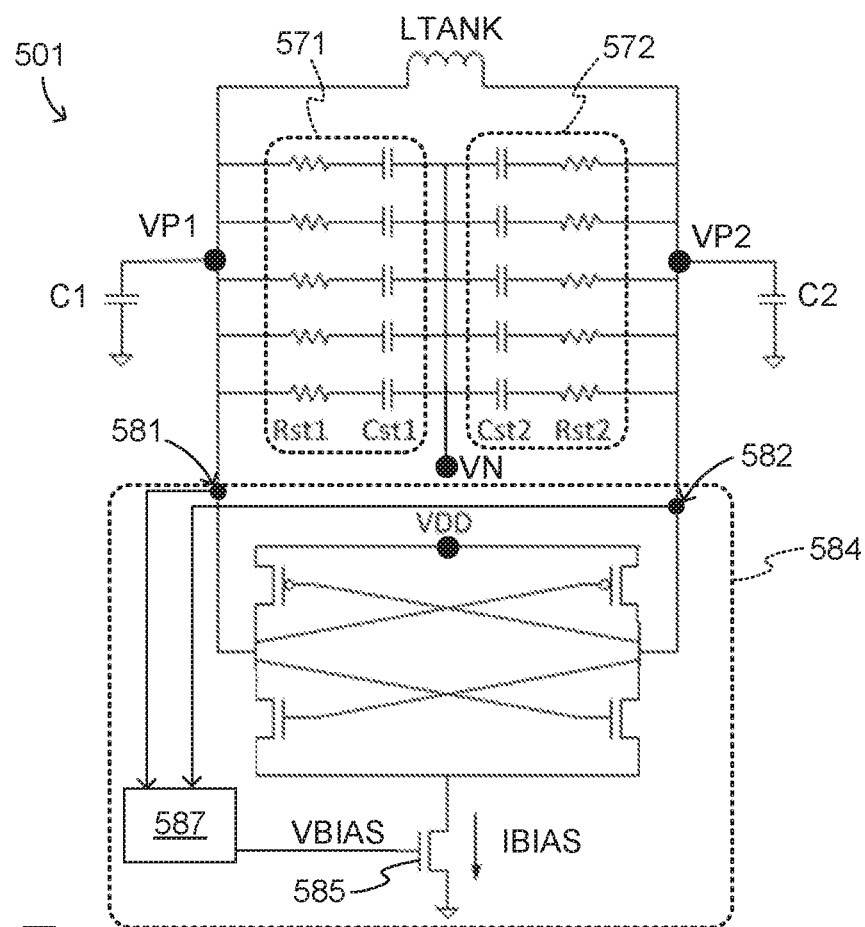
FIG. 5 is an electrical circuit diagram resulting from embodiments.

FIG. 5 is an electrical circuit diagram 501 that results from embodiments. Diagram 501 shows parts of a driver block that includes a first node 581 and a second node 582. Diagram 501 shows bias circuits 584 of a driver block, which are sample particular embodiments of bias circuits 484. In the example of FIG. 5, bias circuits 584 include two pairs of an nFET coupled to a pFET between a VDD node and a bias FET 585. These two pairs are arranged together as a latch, each biasing one of nodes 581, 582 out of phase. First and second shutter signals VP1, VP2 are exported at nodes 581, 582, respectively. Inductor LTANK is coupled between first and second nodes 581, 582. Diagram 501 also shows parasitic capacitors C1, C2.

The swing of shutter signals VP1, VP2 may be from 0.2 V to 5.2 V. They have opposite phases, which is why the driver of FIG. 5 may also be called differential. A differential driver may further result in reduction of electromagnetic interference (EMI).

Diagram 501 further shows modeled electrical equivalents 571, 572 of two shutter parts, which could be shutter parts 471, 472. Equivalent 571 may include parallel strings, each string with a capacitor Cst1 and parasitic resistance Rst1. Similarly, equivalent 572 may include parallel strings, each string with a capacitor Cst2 and parasitic resistance Rst2. Typical values are Cst1=Cst2=120 pF and Rst1=Rst2=5 ohm, although the latter is ideally 0. Accordingly, using inductor LTANK may cause first and second shutter signals VP1, VP2 to be substantially sinusoidal.

Signal VN is exported from a similarly named node VN. Diagram 501 further shows a DC voltage source to bias node VN. VN may be virtual ground, which requires no additional DC power. VN may equal 13 V or any DC voltage desired. It can be set at a DC voltage above VDD to ensure backward biasing of shutter's PN junction.

In a simulation result for diagram 501, VN=10V, VP swings from 0V to 5V, supply voltage is 6V, and supply current is 16 mA. The total power was accordingly about 100 mW.

In some embodiments a swing detection block 587 is also provided. Swing detection block 587 may detect a developing undesirable phase difference between first and second shutter signals VP1, VP2. Swing detection block 587 may thus generate a bias voltage VBIAS responsive to the detected developing difference. Bias voltage VBIAS may affect how much current IBIAS is drawn by bias FET 585, and thus correct the developing difference by a negative feedback operation.

Figure 6:
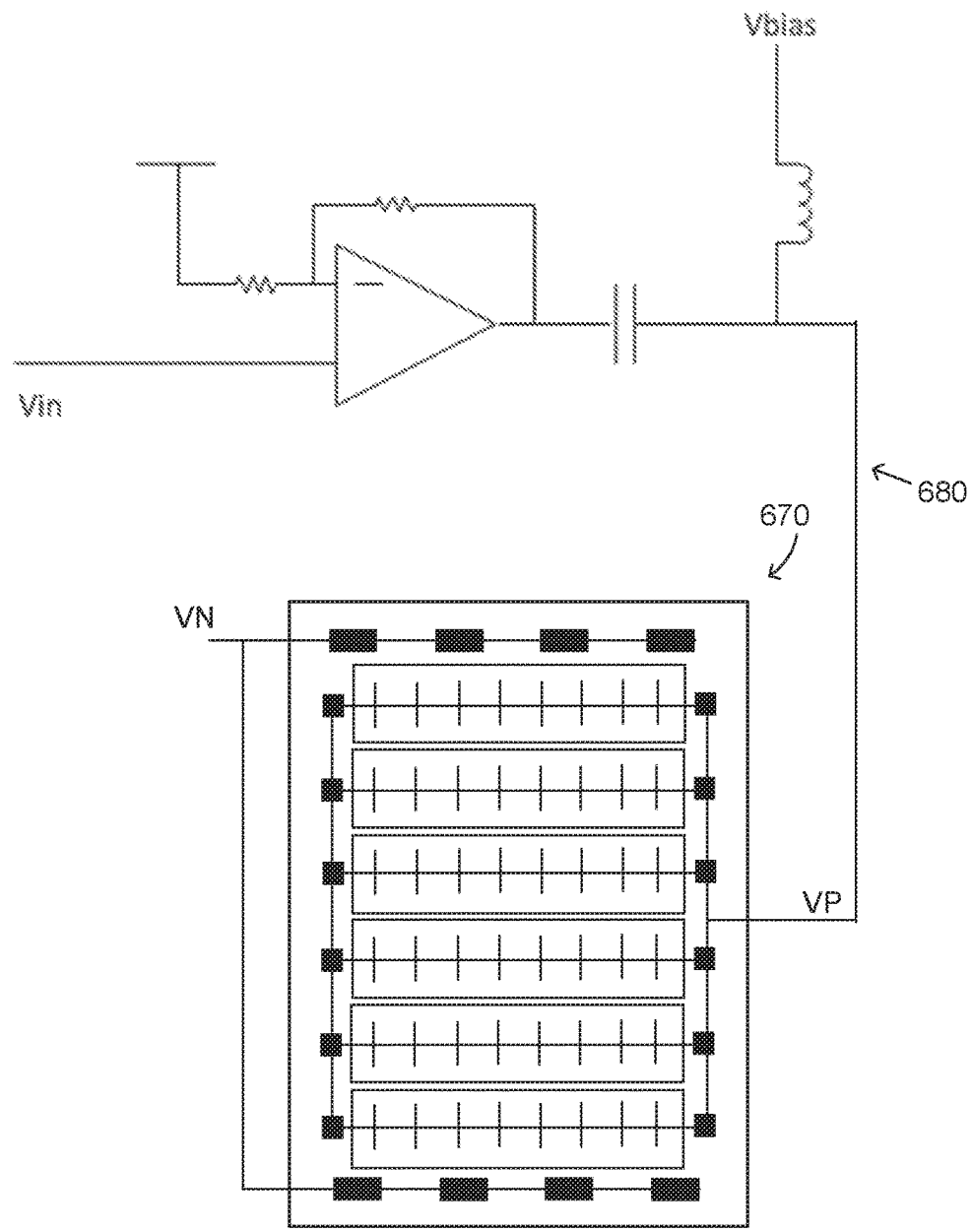
FIG. 6 is a diagram showing components in the prior art.

FIG. 6 shows a driver 680 that generates a single shutter signal VP to drive a shutter 670 as in the prior art. It will be observed that shutter 670 is not partitioned in multiple parts, as is the shutter in view 370. Driver 680 faces a load of 120 pF, 5 to 10 ohm per slice, total 10 slices. Single shutter signal VP can be biased: −10 to −12V DC, reach 5 Vpp AC, and have a frequency of 20 MHz. In such operation, driver 680 may consume 4.8 W of power, which has been a prior art problem.

To distinguish, when the driver block of FIG. 5 drives a shutter as in view 370, the effective capacitance is only ¼ of the total shutter capacitance. This factor alone reduces the required power by a factor of 4. In addition, the inductor LTANK may reduce the required power by another factor of about 10. Indeed, as seen above, the driver block in FIG. 5 may consume power of the order of 100 mW, which is about 48 times less than in FIG. 6.

Another advantage is that, implementing embodiments need not require changing the image processing algorithm for TOF applications. Indeed, there will be data with different phases: A0, A90, A180, A270. The top half data of 4 frames will be: T0=A0, T1=A90, T2=A180, T3=A270. The bottom half data of 4 frames will be: B0=A180, B1=A270, B2=A0, B3=A90. To calculate depth, one needs to calculate (A0−A180)/(A90−A270). This calculation may be from (A0−A180)/(A90−A270)=(T0−T2)/(T1−T3)=(B0−B2)/(B1−B3). There may be, however, crosstalk at the shutter boundary, which can cause error in the depth computation.

In some embodiments, support components are further provided in a locked loop configuration, for example, a phase locked loop (PLL). The locked loop configuration can be such that a voltage control signal is generated responsive to a version of the first shutter signal. In such embodiments the driver block can be configured to receive the voltage control signal. Accordingly, the frequency of first and second shutter signals VP1, VP2 generated by the driver block can be controlled substantially precisely. Examples are now described.

FIG. 7 is a diagram 700 showing a driver block 780 that generates first and second shutter signals VP1, VP2, of which only first shutter signal VP1 is shown. In the embodiment of FIG. 7, driver block 780 includes a voltage-controlled inductor 782 that is configured to receive voltage control signal VC.

Diagram 700 also shows support components 742 that may support a locked loop operation of driver block 780. Support components 742 include a buffer 743, a Divide-by-N unit 744, a phase detector 745, a charge pump 746, and a low pass filter (LPF) 747. Buffer 743 generates a signal CLK_ST, which is a buffered version of first shutter signal VP1. Phase detector 745 also receives a reference clock signal CLK_REF. LPF 747 therefore generates a voltage control signal VC responsive to signal CLK_ST.

FIG. 8 is a diagram 800 showing a driver block 880 that generates first and second shutter signals VP1, VP2, of which only first shutter signal VP1 is shown. In the embodiment of FIG. 8, driver block 880 includes a voltage-controlled capacitor 882 that is configured to receive voltage control signal VC.

Diagram 800 also shows support components 842 that may support a locked loop operation of driver block 880. Support components 842 include a buffer 843, a Divide-by-N unit 844, a phase detector 845, a charge pump 846, and an LPF 847. Buffer 843 generates a signal CLK_ST, which is a buffered version of first shutter signal VP1. Phase detector 845 also receives a reference clock signal CLK_REF. LPF 847 therefore generates a voltage control signal VC responsive to signal CLK_ST.

Returning to FIG. 1, device 100 may also include a light driver 190. Light driver 190 may be configured to generate the previously mentioned light clock signal LCS. In embodiments, light clock signal LCS is generated responsive to first shutter signal VP1.

In some embodiments, additional measures are taken to assist in the generation of light clock signal LCS. These help especially where light source 114 generates modulated light 116 for purposes of determining depth by TOF measurements. Examples are now described.

FIG. 9 is a diagram 900 showing a light driver 990 that generates light clock signal LCS. Light driver 990 includes a voltage-controlled delay line (VCDL) 991, a buffer 993, and a multiplexer 992. Multiplexer 992 may receive a phase select signal PHS, and can be configured to operate responsive to phase select signal PHS. Phase select signal PHS can be generated manually or automatically through depth calibration procedure.

Diagram 900 also shows support components 952 that may support a locked loop operation of light driver 990, and more particularly of VCDL 991. Support components 952 include a phase detector 955, a charge pump 956, and an LPF 957. In this particular example, an operation of light driver 990 is supported by a delay locked loop (DLL) formed by VCDL 991 and support components 952. The DLL may thus be used to select the phase of light source 114. Accordingly, light source 114 may be driven while maintaining a substantially precise phase relationship with the optical shutter.

In diagram 900, signal CLK_ST is received by VCDL 991 and phase detector 955. It will be remembered that signal CLK_ST, which can be called a certain clock signal, may be generated by buffer 843 of FIG. 8 responsive to first shutter signal VP1. Certain clock signal may alternately be generated by buffer 743 of FIG. 7 responsive to first shutter signal VP1. Light driver 990 may generate light clock signal LCS responsive to certain clock signal CLK_ST.

Referring now to FIG. 10, a possible architecture 1000 is described, which can be made from previously described elements. A shutter 1070 is partitioned into two parts, 1071, 1072. A driver block 1080 generates first and second shutter signals VP1, VP2, which are used to drive shutter parts 1071, 1072. Driver block 1080 also generates a negative shutter signal VN. Driver block 1080 includes a voltage controlled capacitor 1082.

Support components 1042 are provided, which can be made from what was described for support components 742 and support components 842. Support components 1042 form a phase-locked loop by receiving first shutter signal VP1 and a clock signal CLK_REF, and generating a certain clock signal CLK_ST and a voltage control signal VC. Voltage control signal VC can be received by voltage controlled capacitor 1082.

Diagram 1000 also shows a light driver 1090 that generates light clock signal LCS. Light driver 1090 includes VCDL 1091, a buffer 1093, and a multiplexer 1092. Multiplexer 1092 receives a phase select signal PHS, and is configured to operate responsive to phase select signal PHS. VCDL 1091 also receives certain clock signal CLK_ST.

Diagram 1000 further shows support components 1052 that may support a locked loop operation of light driver 1090, and more particularly of VCDL 1091. Support components 1052 further receive certain clock signal CLK_ST. In this particular example, an operation of light driver 1090 is supported by a delay locked loop formed by VCDL 1091 and support components 1052. Support components 1052 can be made from what was described for support components 952.

In diagram 1000, a phase calibration module 1094 is configured to generate phase select signal PHS. It may do so from a signal that DET_DEP that encodes the depth detected from a TOF application, and from a signal DEF_DEP that encodes a default depth.

In some embodiments, in addition to the first two shutter signals, the driver block is configured to further generate additional shutter signals, such as a third, a fourth, and more. These additional shutter signals may also have on-phases periodically alternating with off-phases, and their on-phases might not be in phase with the on-phases of the other shutter signals generated by the driver block. In such embodiments, the optical shutter may also have additional parts that are distinct from the other parts, such as a third, a fourth, and more. The additional parts can be configured to alternatingly open and close responsive to the alternating on-phases and off-phases respectively of the additional shutter signals. Similarly, in embodiments, a set of optical shutters may also have additional optical shutters that are distinct from the other optical shutters, such as a third, a fourth, and more. Examples are now described.

Figure 11:
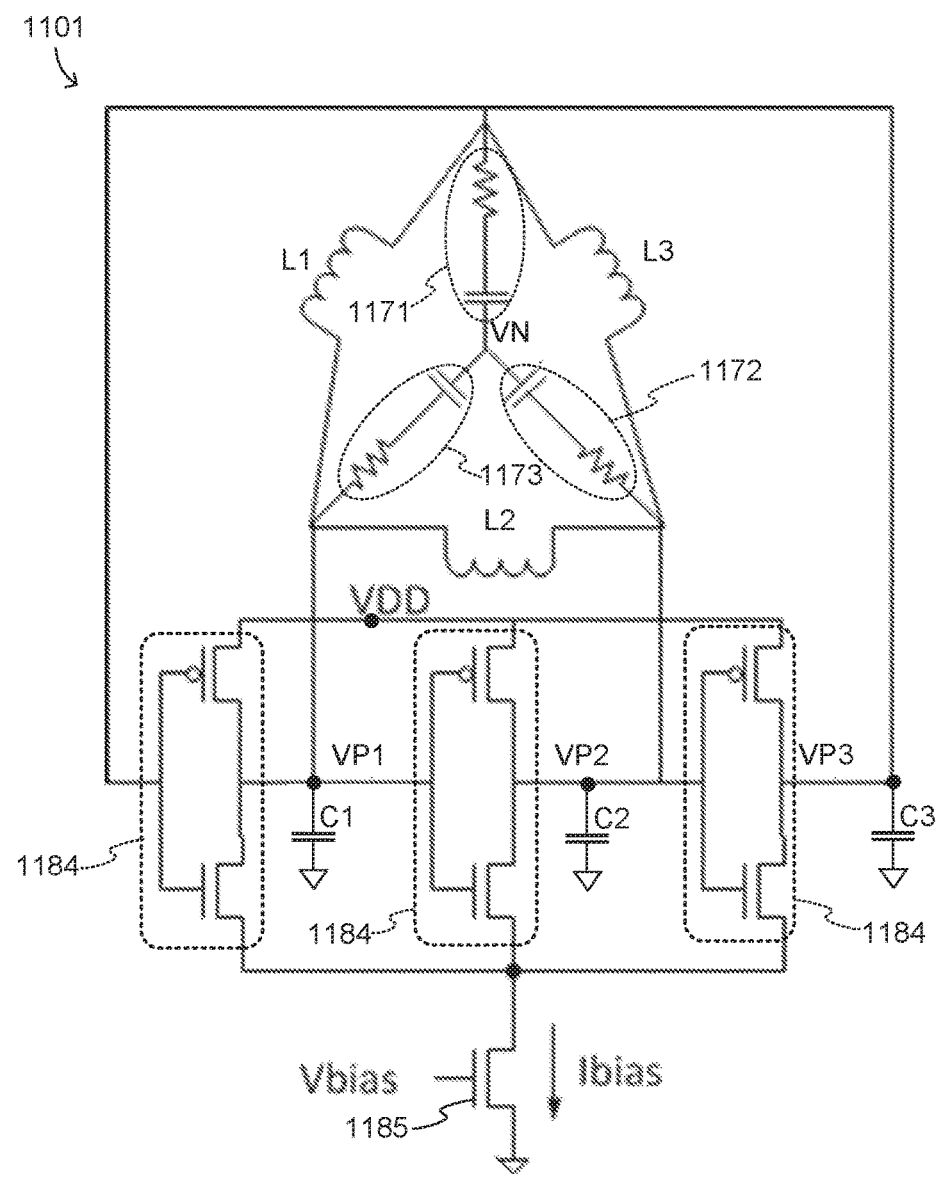
FIG. 11 is an electrical circuit diagram resulting from embodiments where a 3-phase driver is used.

FIG. 11 is an electrical circuit diagram 1101, which may result from embodiments where a 3-phase driver block is used for a three-part shutter. The shutter is modeled electrically by equivalent circuits 1171, 1172, 1173, which may have values similar to each other.

Diagram 1101 shows a VDD node, a bias FET 1185, and three bias circuits 1184 between the VDD node and bias FET 1185. Three shutter signals VP1, VP2, VP3 are generated at nodes, whose parasitic capacitances C1, C2, C3 are also shown. Shutter signals VP1, VP2, VP3 can be substantially sinusoidal, with a phase delay of 360°/3=120° between any two of them. In FIG. 11, the driver block also uses three inductors L1, L2, L3, which may have values similar to each other.

Figure 12:
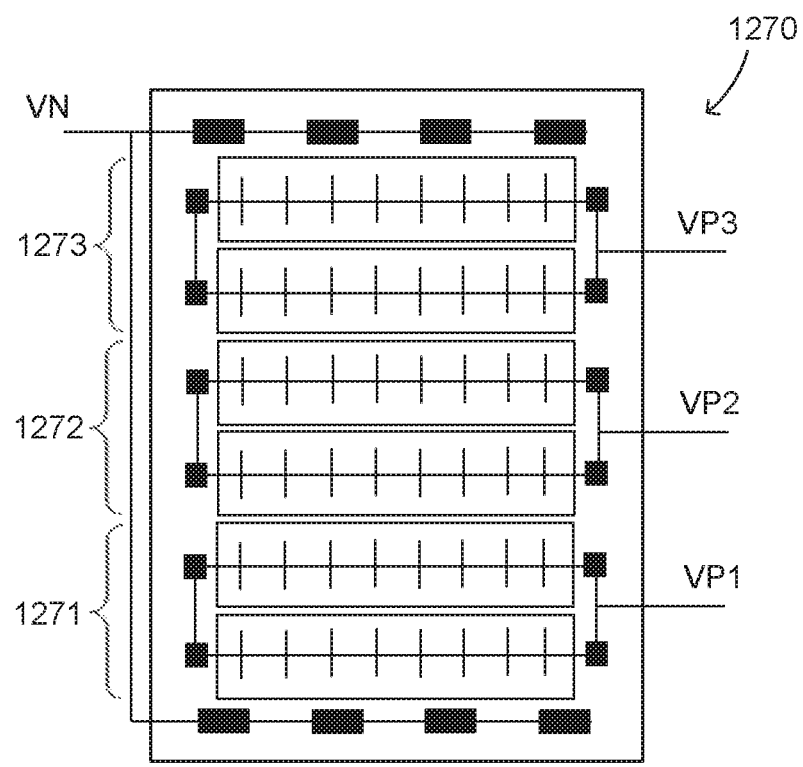
FIG. 12 is a plan view of a sample optical shutter that is partitioned in three parts according to embodiments.

FIG. 12 shows an optical shutter 1270 that is partitioned in three parts 1271, 1272, 1273 according to embodiments. It will be recognized that the partitioning may be effectuated via different connections than in the shutter of view 370 of FIG. 3. The three shutter parts 1271, 1272, 1273 may receive and be driven by three respective shutter signals VP1, VP2, VP3, which may have been generated as shown in FIG. 11.

Figure 13:
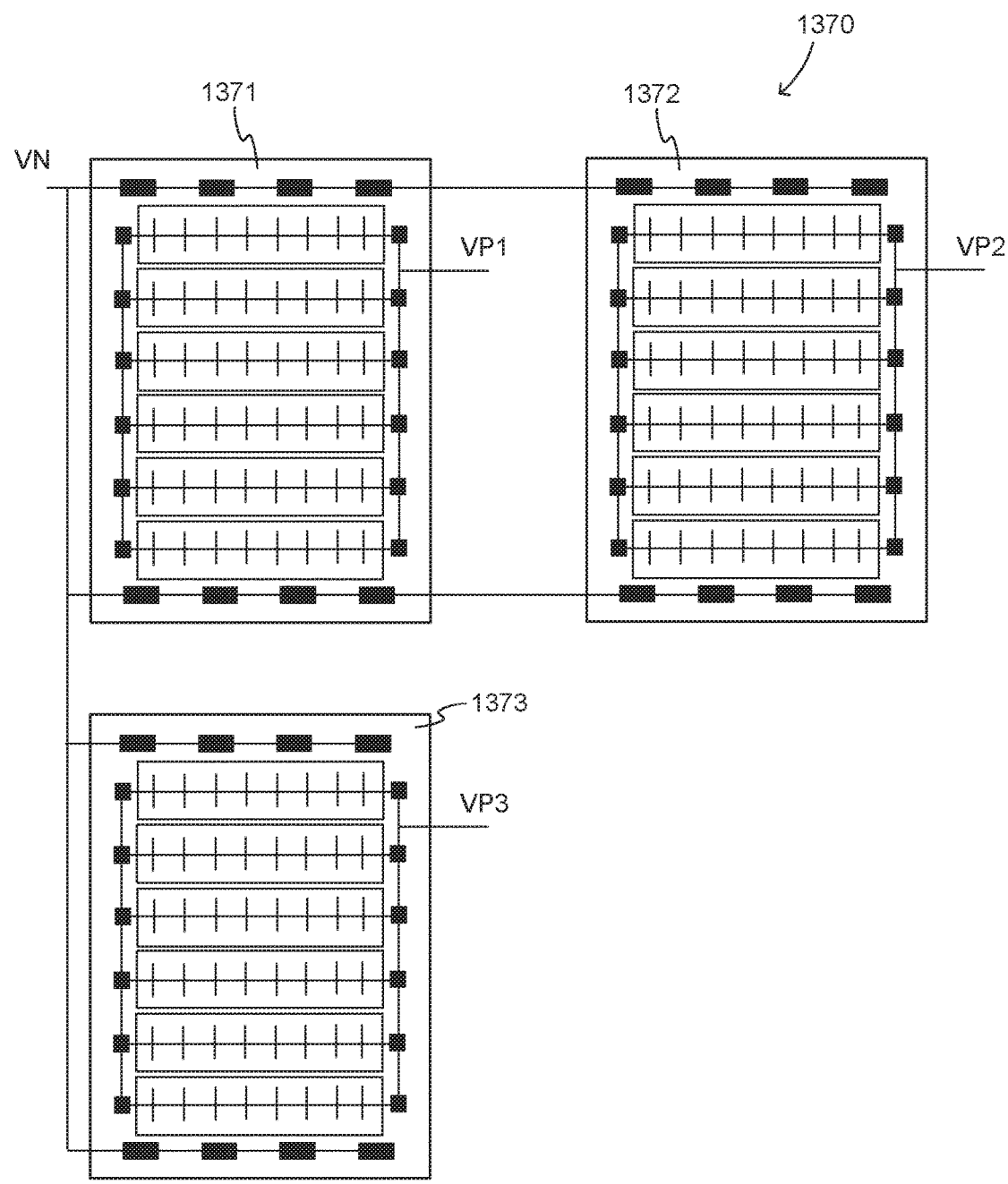
FIG. 13 is a plan view of a sample set of three optical shutters that are driven by shutter signals that are not in phase according to embodiments.

FIG. 13 shows a set 1370 of three optical shutters 1371, 1372, 1373. These three shutters 1371, 1372, 1373 may receive and be driven by three respective shutter signals VP1, VP2, VP3, which may have been generated as shown in FIG. 11.

Figure 14:
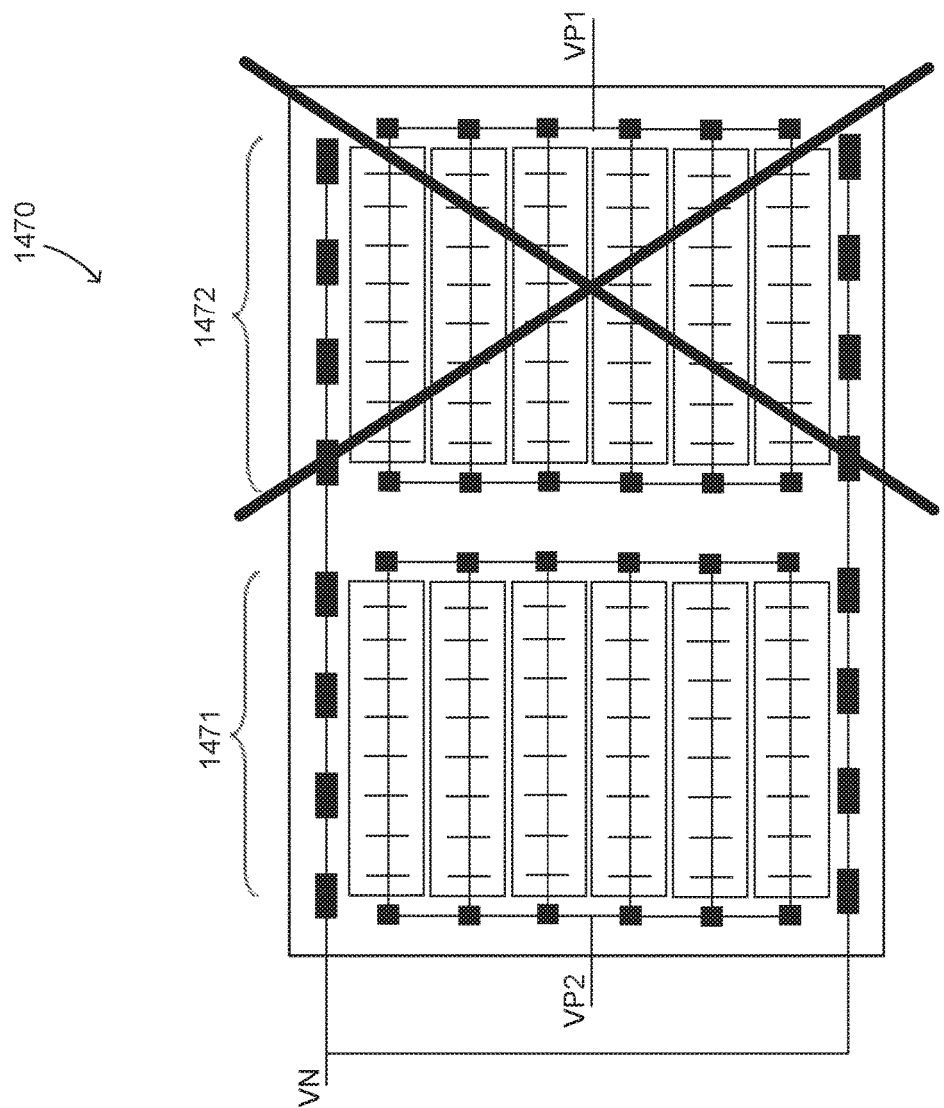
FIG. 14 is a plan view of a sample optical shutter that includes a dummy part according to embodiments.

FIG. 14 shows a sample optical shutter 1470 that includes two parts 1471, 1472. Of those, part 1472 is considered a dummy part, because there are no pixels behind it. Still, driving it requires less power as discussed above.

Figure 15:
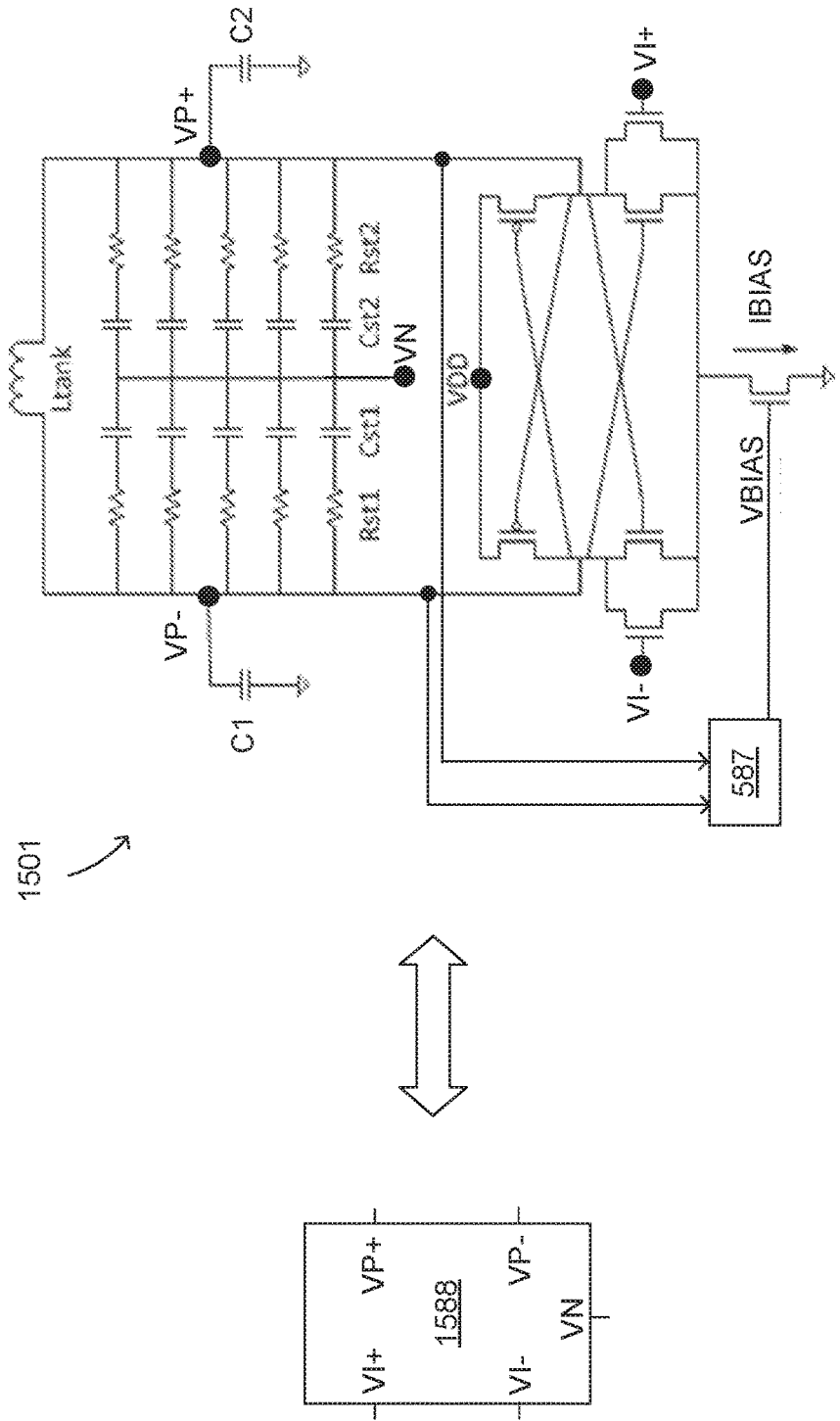
FIG. 15 is a block diagram of a driver unit according to embodiments, and a detailed electrical circuit diagram resulting from it, according to embodiments.

FIG. 15 shows a driver unit 1588, and a detailed diagram 1501 that may result from driver unit 1588. It will be recognized that driver unit 1588 can be made by starting with the elements of the driver of FIG. 5, and augmenting with the capability that the bias circuits be driven by further input signals VI−, VI+. Driver unit 1588 may be used to assemble driver blocks that generate multiple shutter signals, as will be appreciated from the examples below.

Figure 16:
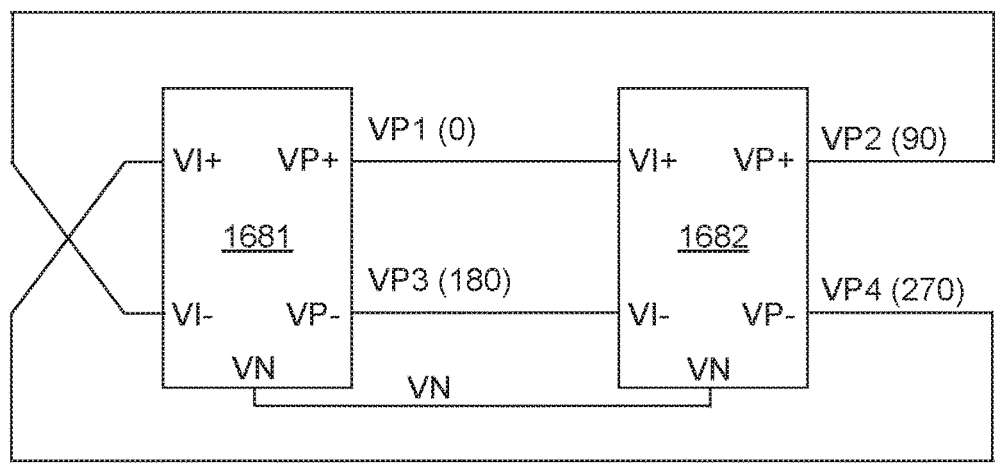
FIG. 16 is a block diagram of a sample 4-phase driver block that uses driver units in a ring configuration according to embodiments.

FIG. 16 shows a 4-phase driver block 1680. The generated first, second, third and fourth shutter signals, along with their respective phases, are VP1(0°), VP2(90°), VP3(180°), and VP4(270°). Driver block 1680 uses two driver units 1681, 1682 in a ring configuration. Driver units 1681, 1682 can be made as driver unit 1588, or in a similar manner. In this embodiment, first driver unit 1681 generates the first and the third shutter signals in response to receiving the third and the fourth shutter signals. Moreover, second driver unit 1682 generates the second and the fourth shutter signals in response to receiving the first and the third shutter signals.

Figure 17:
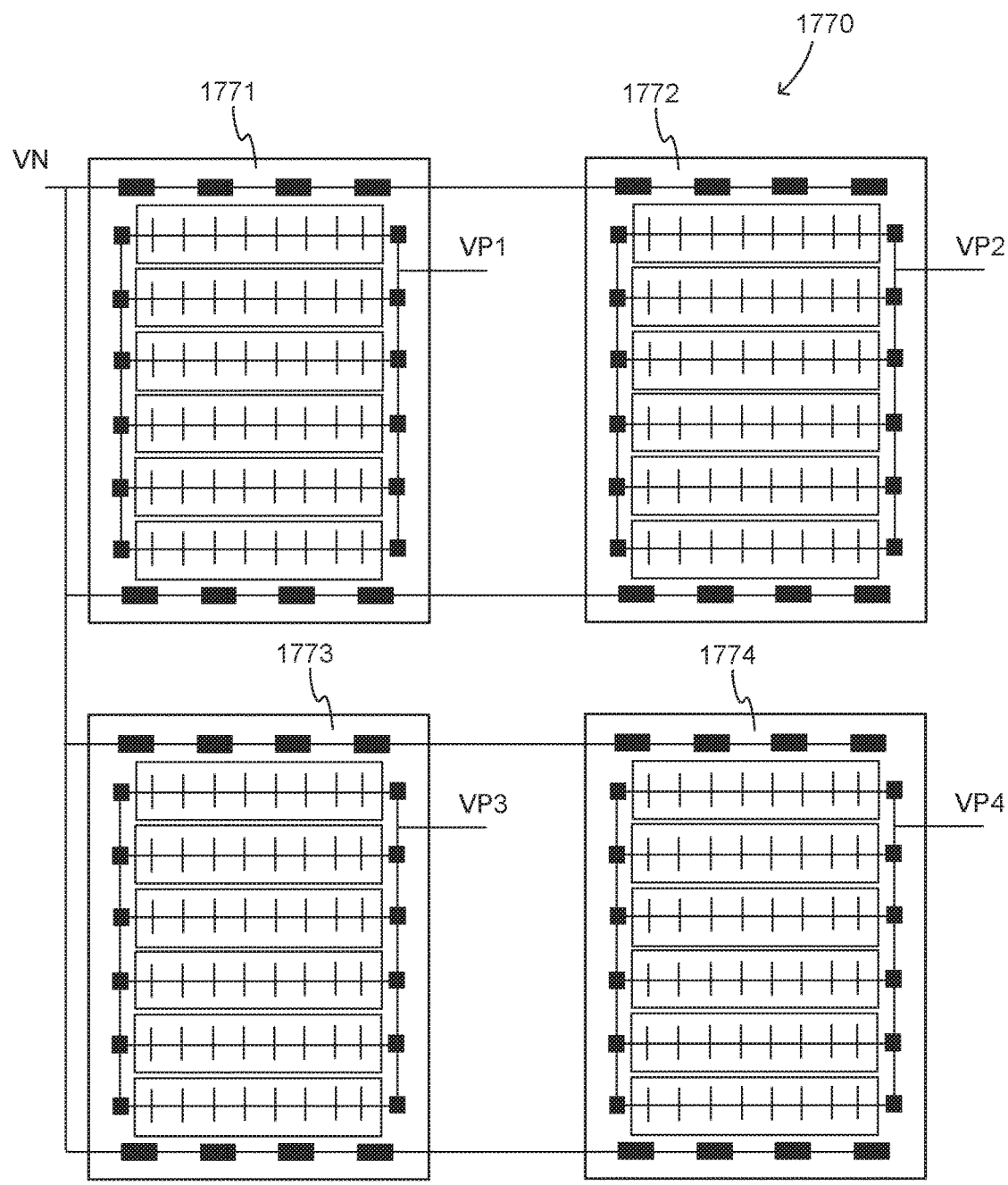
FIG. 17 is a plan view of a sample set of four optical shutters that are driven by shutter signals that are not in phase according to embodiments.

FIG. 17 shows a set 1770 of four optical shutters 1771, 1772, 1773, 1774. These four shutters 1771, 1772, 1773 1774 may receive and be driven by four respective shutter signals VP1, VP2, VP3, VP4, which may have been generated as shown in FIG. 16.

Figure 18:
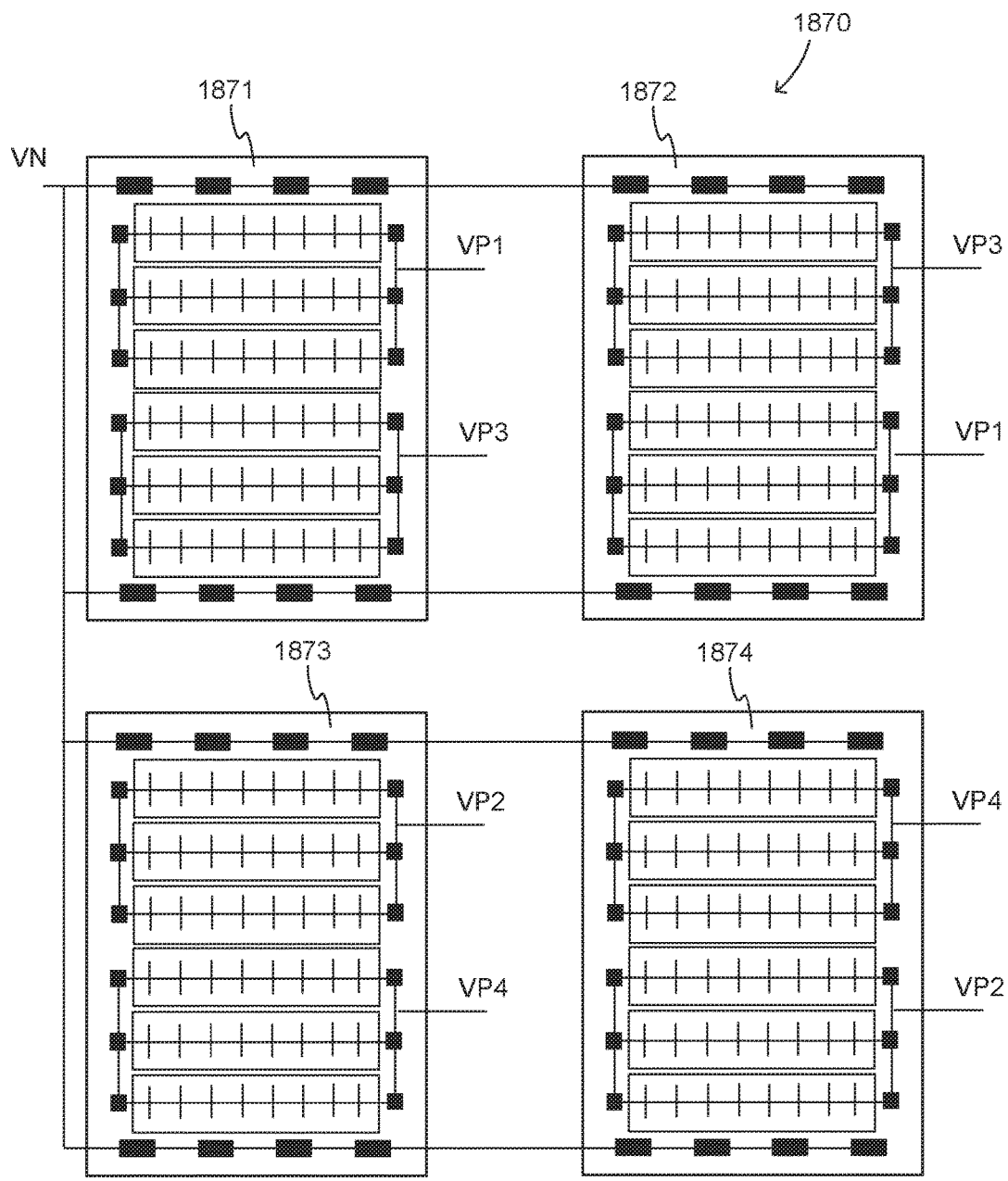
FIG. 18 is a plan view of a sample set of four optical shutters, each partitioned in two parts, and which are driven by shutter signals that are not in phase according to embodiments.

FIG. 18 shows a set 1870 of four optical shutters 1871, 1872, 1873, 1874. Each is partitioned as shown. The different parts may receive and be driven by four respective shutter signals VP1, VP2, VP3, VP4, which may have been generated as shown in FIG. 16.

Figure 19:
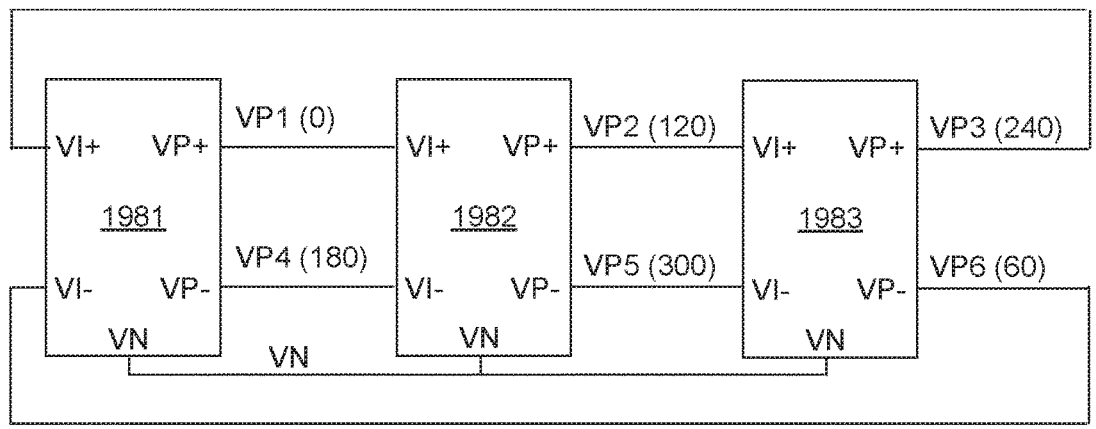
FIG. 19 is a block diagram of a sample 6-phase driver block that uses driver units in a ring configuration according to embodiments.

FIG. 19 shows a 6-phase driver block 1980. The generated shutter signals, along with their respective phases, are VP1 (0°), VP2(120°), VP3(240°), VP4(180°), VP5(300°) and VP6(60°. Driver block 1980 uses three driver units 1981, 1982, 1983 in a ring configuration. Driver units 1981, 1982, 1983 can be made as driver unit 1588, or in a similar manner.

Figure 20:
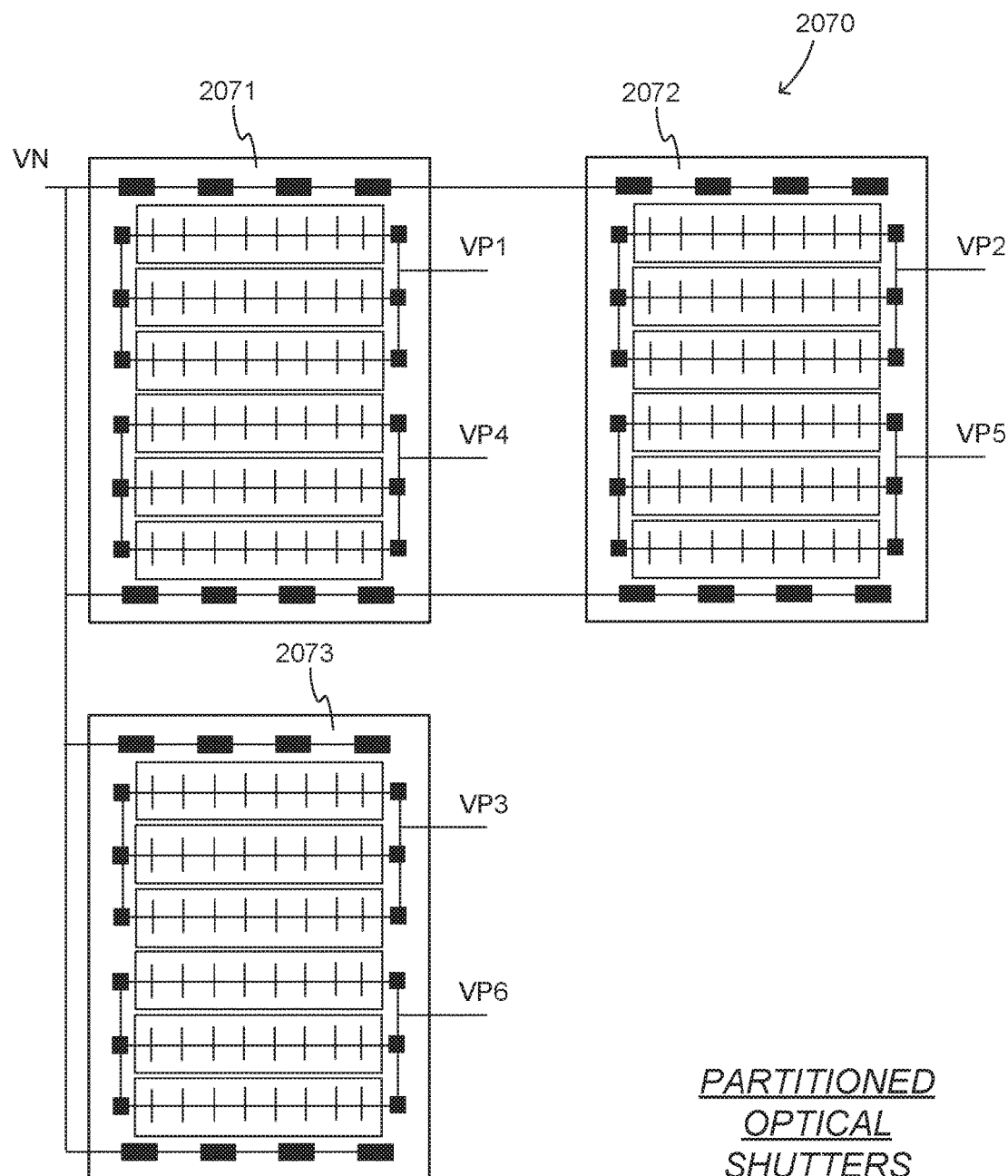
FIG. 20 is a plan view of a sample set of three optical shutters, each partitioned in two parts, and which are driven by shutter signals that are not in phase according to embodiments.

FIG. 20 shows a set 2070 of three optical shutters 2071, 2072, 2073. Each is partitioned as shown. The different parts may receive and be driven by six respective shutter signals VP1, VP2, VP3, VP4, VP5, VP6, which may have been generated as shown in FIG. 19.

Again, implementing embodiments need not require changing the image processing algorithm for TOF applications. Indeed, there will be three frames of data with different phases: A0, A120, A240. The top half data of 3 frames will be: T0=A0, T1=A120, T2=A240. The bottom half data of 3 frames will be: B0=A180, B1=A300, B2=A60. To calculate depth, one needs to calculate (A240−2A120+A0)/(A0−A240). Since A180=A−A0, A300=A−A120, A60=A−A240, where A is the total optical signal, then (T2−2T1+T0)/(T0−T2)=(B2−2B1+B0)/(B0−B2). There may be, however, crosstalk at the shutter boundary, which can cause error in the depth computation.

Figure 21:
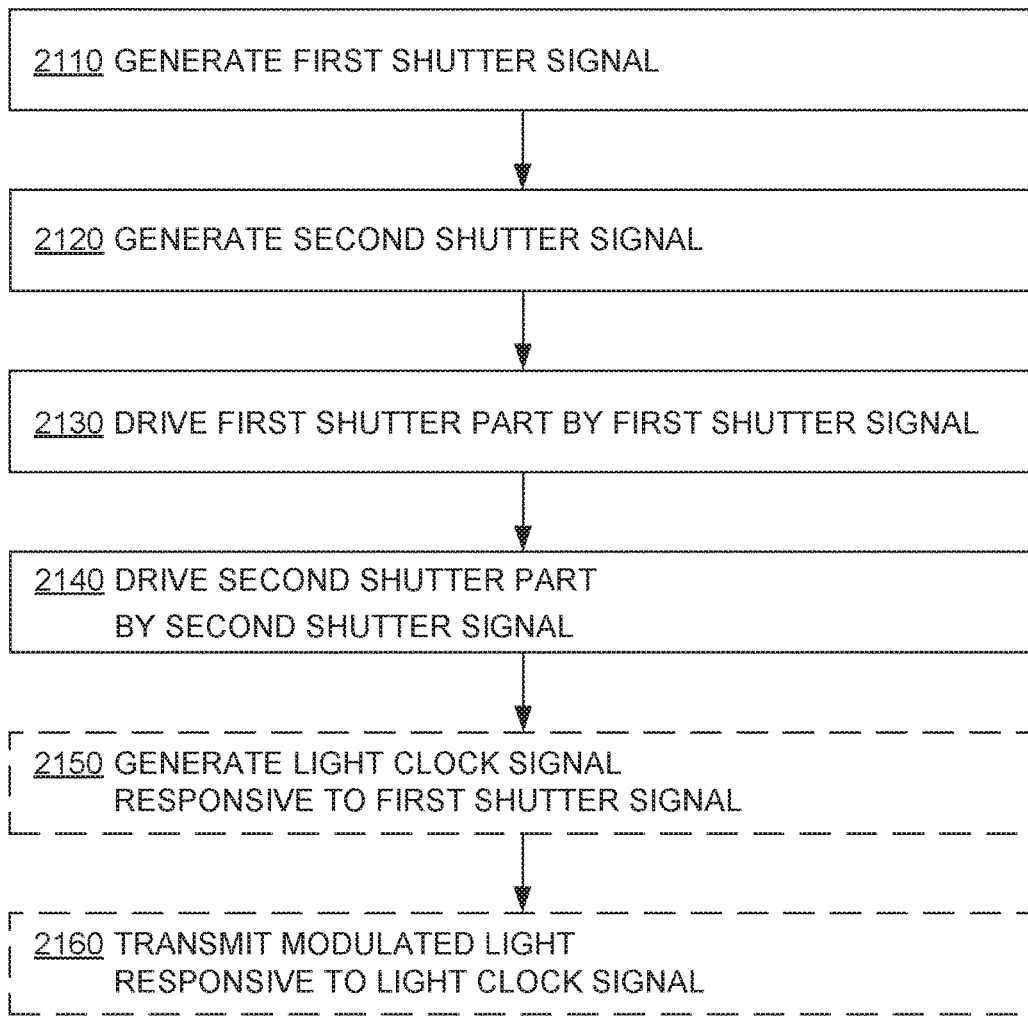
FIG. 21 is a flowchart for illustrating methods according to embodiments.

FIG. 21 shows a flowchart 2100 for describing methods according to embodiments. The methods of flowchart 2100 may also be practiced by embodiments described elsewhere in this document, and especially where a shutter is partitioned in two or more parts.

According to an operation 2110, a first shutter signal is generated, for example by a driver block. The first shutter signal may have on-phases periodically alternating with off-phases.

According to another operation 2120, a second shutter signal is generated, for example by a driver block. The second shutter signal may have on-phases periodically alternating with off-phases. The on-phases of the first shutter signal might not be in phase with the on-phases of the second shutter signal.

According to another operation 2130, a first shutter part can be driven by the first shutter signal, to alternatingly open and close responsive to the on-phases and to the off-phases respectively of the first shutter signal.

According to another operation 2140, a second shutter part can be driven by the second shutter signal, to alternatingly open and close responsive to the on-phases and to the off-phases respectively of the second shutter signal.

According to another, optional operation 2150, a light clock signal LCS may be generated by a light driver, responsive to the first shutter signal. According to another, optional operation 2160, modulated light can be transmitted by a light source, responsive to the light clock signal LCS.

Figure 22:
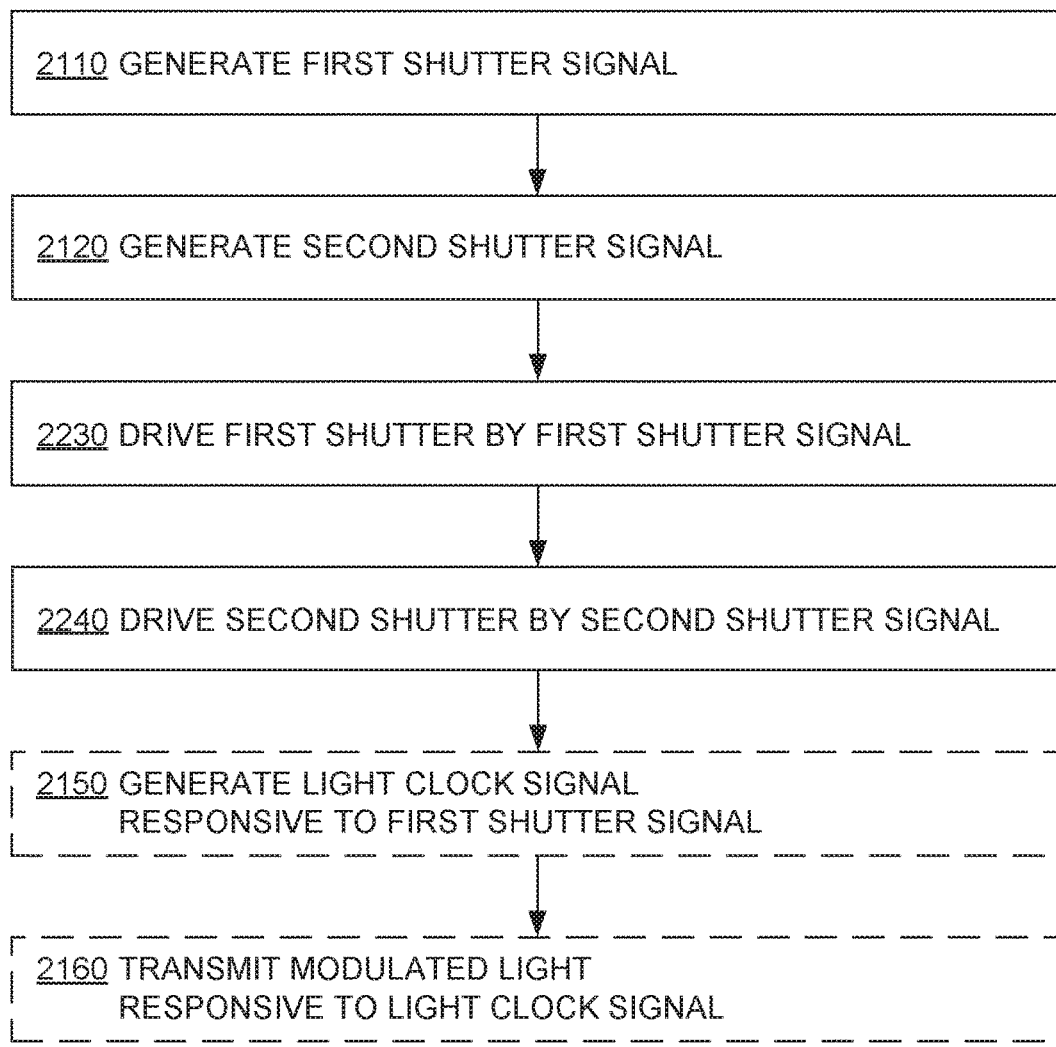
FIG. 22 is a flowchart for illustrating methods according to embodiments.

FIG. 22 shows a flowchart 2200 for describing methods according to embodiments. The methods of flowchart 2200 may also be practiced by embodiments described elsewhere in this document, and especially where a set of multiple shutters is used, whether they are partitioned or not. Flowchart 2200 includes the above described operations 2110, 2120, and optional operations 2150, 2160.

According to another operation 2230, a first shutter can be driven by the first shutter signal, to alternatingly open and close responsive to the on-phases and to the off-phases respectively of the first shutter signal.

According to another operation 2240, a second shutter can be driven by the second shutter signal, to alternatingly open and close responsive to the on-phases and to the off-phases respectively of the second shutter signal.

In this description a reference numeral may be used consistently to denote the same aspect, component, or process. Moreover, a further effort may have been made in the drafting of this description to choose similar though not identical reference numerals to denote versions or embodiments of an aspect, component or process that are the same or possibly different. Such a further effort is not required. Even where made in this document, such an effort might not have been made completely consistently throughout the many versions or embodiments that are made possible by this description. Regardless, where made, this further effort is intended gratuitously to assist comprehension by the reader. Accordingly, any similarity in reference numerals is subordinated to the text of this description; it may be used as a confirmation of a similarity in the text, but not to confuse aspects that the text indicates as different.

In the methods described above, each operation can be performed as an affirmative step of doing, or causing to happen, what is written that can take place. Such doing or causing to happen can be by the whole system or device, or just one or more components of it. In addition, the order of operations is not constrained to what is shown, and different orders may be possible according to different embodiments. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily the present invention. Plus, any reference to any prior art in this description is not, and should not be taken as, an acknowledgement or any form of suggestion that this prior art forms parts of the common general knowledge in any country.

This description includes one or more examples, but that does not limit how the invention may be practiced. Indeed, examples or embodiments of the invention may be practiced according to what is described, or yet differently, and also in conjunction with other present or future technologies. Other embodiments include combinations and sub-combinations of features described herein, including for example, embodiments that are equivalent to: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In this document, the phrases "constructed to" and/or "configured to" denote one or more actual states of construction and/or configuration that is fundamentally tied to physical characteristics of the element or feature preceding these phrases and, as such, reach well beyond merely describing an intended use. Any such elements or features can be implemented in any number of ways, as will be apparent to a person skilled in the art after reviewing the present disclosure, beyond any examples shown in this document.

The following claims define certain combinations and subcombinations of elements, features and steps or operations, which are regarded as novel and non-obvious. Additional claims for other such combinations and subcombinations may be presented in this or a related document.

What is claimed is:

1. An imaging device comprising:
a casing with an opening;
a shutter driver within the casing, the shutter driver comprising a first node, a second node, and an inductor coupled between the first and the second nodes, the shutter driver generating a first shutter signal and a second shutter signal, the shutter driver generating the first shutter signal at the first node and the second shutter signal at the second node, wherein the first shutter signal is active during a first period of time and the second shutter signal is active during a second period of time, and wherein the second period of time does not overlap the first period of time; and
a first optical shutter and a second optical shutter within the casing, wherein the second optical shutter is different from the first optical shutter, wherein the first optical shutter is driven by the first shutter signal and the second optical shutter is driven by the second shutter signal, and wherein:
the first optical shutter is open and the second optical shutter is closed during the first period of time, and
the first optical shutter is closed and the second optical shutter is open during the second period of time.

2. The imaging device of claim 1, wherein the first optical shutter is adjacent to the second optical shutter within the casing.

3. The imaging device of claim 1, wherein the first period of time and the second period of time are contiguous.

4. The imaging device of claim 1, further comprising:
a first group of pixels positioned within the casing, wherein the first group of pixels receives light through the opening when the first optical shutter is open, and wherein light passing through the opening during the second period, when the first optical shutter is closed, is blocked from reaching the first group of pixels; and
a second group of pixels positioned within the casing and different from the first group of pixels, wherein the second group of pixels receives light through the opening when the second optical shutter is open, and wherein light passing through the opening during the first period, when the second optical shutter is closed, is blocked from reaching the second group of pixels.

5. The imaging device of claim 4, wherein the first group of pixels is arranged in a first plurality of rows and the second group of pixels is arranged in a second plurality of rows, and wherein light is blocked from reaching pixels from a row of pixels in the first plurality of rows when pixels from a row of pixels in the second plurality of rows are receiving the light.

6. The imaging device of claim 4, wherein the first group of pixels and the second group of pixels are arranged within a single pixel array.

7. The imaging device of claim 4, wherein at least one of the following includes Time-Of-Flight (TOF) pixels:
the first group of pixels; and
the second group of pixels.

8. The imaging device of claim 4, further comprising:
a light driver within the casing, wherein the light driver generates a light clock signal responsive to the first shutter signal; and
a light source on the casing, wherein the light source transmits, responsive to the light clock signal, modulated light towards an object outside the casing, and wherein the first group of pixels images reflections of the modulated light from the object.

9. The imaging device of claim 8, further comprising:
a buffer that outputs an intermediate clock signal responsive to the first shutter signal, and
wherein the light driver generates the light clock signal responsive to the intermediate clock signal.

10. The imaging device of claim 1, further comprising:
support components in a locked loop configuration such that a voltage control signal is generated through the locked loop configuration in response to a version of the first shutter signal, and
wherein the shutter driver receives the voltage control signal.

11. The imaging device of claim 1, in which
the shutter driver further generates a third shutter signal that is active during a third period of time, wherein the third period of time is different from the first and the second periods of time, and
wherein the imaging device further comprises:
a third optical shutter within the casing, wherein the third optical shutter is different from the first and the second optical shutters, and wherein the third optical shutter is driven by the third shutter signal such that the third optical shutter is open during the third period of time.

12. The imaging device of claim 11, in which
the shutter driver further generates a fourth shutter signal that is active during a fourth period of time, wherein the fourth period of time is different from the first, the second, and the third periods of time, and
wherein the imaging device further comprises:
a fourth optical shutter within the casing, wherein the fourth optical shutter is different from the first, the second, and the third optical shutters, and wherein the fourth optical shutter is driven by the fourth shutter signal such that the fourth optical shutter is open during the fourth period of time.

13. The imaging device of claim 12, in which
the shutter driver includes a first driver unit and a second driver unit different from the first driver unit, wherein the first driver unit generates the first and the third shutter signals in response to receiving the second and the fourth shutter signals, and wherein the second driver unit generates the second and the fourth shutter signals in response to receiving the first and the third shutter signals.

14. A method for an imaging device that includes a casing with an opening, wherein the method comprises performing the following using the imaging device:
generating, by a shutter driver within the casing, a first shutter signal and a second shutter signal, the shutter driver including a first node, a second node, and an inductor coupled between the first and the second nodes, wherein the shutter driver generating the first shutter signal at the first node and the second shutter signal at the second node, wherein the first shutter signal is active during a first period of time and the second shutter signal is active during a second period of time, and wherein the second period of time does not overlap the first period of time;
driving, by the first shutter signal, a first optical shutter within the casing;
driving, by the second shutter signal, a second optical shutter within the casing, wherein the second optical shutter is different from the first optical shutter;
maintaining the first optical shutter open and the second optical shutter closed during the first period of time; and
maintaining the first optical shutter closed and the second optical shutter open during the second period of time.

15. The method of claim 14, wherein the first optical shutter is adjacent to the second optical shutter within the casing, and wherein the first period of time and the second period of time are contiguous.

16. The method of claim 14, further comprising:
providing light to a first group of pixels positioned within the casing when the first optical shutter is open, wherein light passing through the opening during the second period, when the first optical shutter is closed, is blocked from reaching the first group of pixels; and
providing light to a second group of pixels positioned within the casing when the second optical shutter is open, wherein the second group of pixels is different from the first group of pixels, and wherein light passing through the opening during the first period, when the second optical shutter is closed, is blocked from reaching the second group of pixels.

17. An imaging device comprising:
a casing with an opening;
a shutter driver within the casing, the shutter driver including a first node, a second node and an inductor coupled between the first and second nodes, wherein the shutter driver generates a first shutter signal at the first node and a second shutter signal at the second node, wherein the first shutter signal is active during a first period of time and the second shutter signal is active during a second period of time, and wherein the second period of time does not overlap the first period of time;

a light driver within the casing, wherein the light driver generates a light clock signal responsive to the first shutter signal;

a light source on the casing, wherein the light source transmits, responsive to the light clock signal, modulated light towards an object outside the casing; and a first optical shutter and a second optical shutter within the casing, wherein the second optical shutter is different from the first optical shutter, wherein the first optical shutter is driven by the first shutter signal and the second optical shutter is driven by the second shutter signal, and wherein:

the first optical shutter is open and the second optical shutter is closed during the first period of time, and the first optical shutter is closed and the second optical shutter is open during the second period of time.

18. The imaging device of claim 17, further comprising:

support components in a locked loop configuration such that a voltage control signal is generated through the locked loop configuration in response to a version of the first shutter signal, and wherein the shutter driver includes one of the following:

the inductor that is a voltage-controlled inductor that receives the voltage control signal for controlling frequencies of the first and the second shutter signals, and a voltage-controlled capacitor that receives the voltage control signal for controlling frequencies of the first and the second shutter signals.

19. The imaging device of claim 17, wherein the shutter driver includes:

bias circuits arranged together as a latch and biasing the first node and the second node within the shutter driver.

* * * * *